United States Patent [19]

Eitner, Jr. et al.

[11] Patent Number: 5,150,822
[45] Date of Patent: Sep. 29, 1992

[54] MIXING HEAD FOR DISPENSING AN ACTINE INGREDIENT

[75] Inventors: Joseph G. Eitner, Jr., Park Ridge; Robert J. Tice, Jr., Stockholm, both of N.J.

[73] Assignee: The Wellcome Foundation Limited, London, England

[21] Appl. No.: 647,812

[22] Filed: Jan. 30, 1991

Related U.S. Application Data

[63] Continuation-in-part of Ser. No. 428,852, Oct. 27, 1989, Pat. No. 5,020,689.

[30] Foreign Application Priority Data

Oct. 26, 1990 [EP] European Pat. Off. ........ 90311754.7

[51] Int. Cl.⁵ .............................................. G01F 11/00
[52] U.S. Cl. ..................................... 222/145; 222/399; 222/444; 222/630; 239/308; 239/366; 239/368; 239/369; 239/373; 137/101.11; 137/205.5; 406/109; 406/127; 169/15; 169/85
[58] Field of Search ............... 222/145, 444, 399, 630; 239/308, 366, 368, 369, 373; 137/101.11, 205.5; 406/109, 127; 169/15, 85

[56] References Cited

U.S. PATENT DOCUMENTS

| | | | |
|---|---|---|---|
| 4,940,185 | 7/1990 | Fu | 239/366 X |
| 4,969,579 | 11/1990 | Behar | 222/145 X |
| 4,994,180 | 2/1991 | Sims et al. | 222/399 X |
| 5,085,278 | 2/1992 | Keltner | 169/15 |
| 5,086,846 | 2/1992 | Carlson | 169/15 |

Primary Examiner—Michael S. Huppert
Assistant Examiner—Anthoula Pomrening
Attorney, Agent, or Firm—Ladas & Parry

[57] ABSTRACT

An apparatus for dispersing an active ingredient, such as a fumigant, fertilizer or room freshener in which the active ingredient is placed in a sample cylinder and a pressurized solvent/propellent is subsequently introduced from a source. The solvent/propellent expands to adopt a liquid phase and a gaseous phase. The liquid phase serves to absorb the active ingredient and the gaseous phase serves to propel the borne active ingredient out of the apparatus through a dispensing outlet where further expansion takes place and the active ingredient is dispersed in a fog or mist. Flow restrictors create a pressure differential between the sample cylinder outlet and a by-pass portion to enable total absorption of the active ingredient. The flow restrictors and conduits for the system are contained in a mixing head for the sample cylinder. The system is particularly suitable for the spraying of insecticides where a metered amount of active ingredient is to be dispersed or for exhausting a total supply of active ingredient.

8 Claims, 4 Drawing Sheets

MIXING HEAD FOR DISPENSING AN ACTIVE INGREDIENT

This application is a continuation-in-part of U.S. application Ser. No. 07/428,852 filed Oct. 27, 1989, and now U.S. Pat. No. 5,020,689.

BACKGROUND OF THE INVENTION

The invention relates to the dispensing of a gaseous charge of an active ingredient. The invention is generally applicable to the dispersing of atomized sprays and finds particular use in the spraying of insecticides.

However, the invention is equally applicable to the dispensing of room fresheners, fertilizers and any other active ingredients which are capable of being borne in an atomized mist.

The invention finds particular applicability where a specific volume of atomized spray is to be dispensed. For example, if a warehouse is to be sprayed with a view to exterminating a particular insect, then the concentration and amount of insecticide must be carefully calculated. The dispensing system of the present invention is capable of dispensing that calculated amount into a specifically confined volume of air. This represents an advance over previous spray systems where either an entire volume was dispensed until the dispensing medium was exhausted or control valves were selectively closed on a hit or miss basis when it was felt that sufficient volume had been dispensed.

The invention is also applicable to charge portable cylinders of pressurized fumigant, etc. for manual dispersal.

U.S. Pat. No. 4,488,946 to Latif et al is concerned with the automatic mixing of a quantity of liquid compound and liquid propellent. The Latif system is complex in nature including a multiplicity of valves and cylinders. The complexity of the Latif system makes automation with long term reliability difficult and, moreover, is not susceptible to closely controlled dispersal of an accurately determined amount of active ingredient.

SUMMARY OF THE INVENTION

In its broadest concept the system of the present invention utilizes a solvent/carrier in liquid form. That solvent/carrier would most conveniently be contained in a large volume supply cylinder. A sample or dosing cylinder containing active ingredient is located downstream of the supply cylinder and is coupled thereto by a conduit. The most convenient solvent/carrier is liquid carbon dioxide and the active ingredient is most usually in liquid form. Valve means are arranged selectively to place the supply cylinder in direct connection with the sample or dosing cylinder while closing any exit from the dosing cylinder to atmosphere or to isolate the supply cylinder and connect the dosing cylinder to atmosphere. In this manner, liquid carbon dioxide will flow in liquid form, from the supply cylinder to the sample cylinder. Upon introduction into the sample cylinder, the liquid carbon dioxide will expand until a steady state of equilibrium is reached in which the sample cylinder contains both liquid carbon dioxide and gaseous carbon dioxide. Once this steady state is reached, the system is in equilibrium and it is not, at this stage, necessary to isolate the supply cylinder since, under constant temperature and pressure conditions, the sample cylinder cannot be overfilled.

The liquid carbon dioxide within the sample cylinder acts as a solvent and absorbs all of the active ingredient which had been placed in the sample cylinder. The gaseous carbon dioxide does not act as a solvent but, instead, acts as a propelling medium to propel the absorbed active ingredient from the system when the sample cylinder is connected to atmosphere.

From the foregoing, it will be appreciated that the maximum amount of active ingredient that can be dispensed is the amount of active ingredient which had been placed in the sample cylinder prior to the introduction of solvent/carrier (liquid carbon dioxide) from the supply cylinder.

According to one aspect of the invention an apparatus for mixing and dispensing an active ingredient comprises a source of liquid solvent/propellant and a sample cylinder containing a charge of active ingredient. A first conduit extends between the source and an inlet of said sample cylinder for connecting the sample cylinder to said source. A junction located in said first conduit intermediate the source and the sample cylinder and a second conduit extends from said first junction to by-pass the sample cylinder for dividing a flow of said liquid solvent/propellant upstream of the sample cylinder to cause a first portion of the liquid solvent/propellant to flow into the sample cylinder to both absorb and force out said active ingredient and a second portion of the liquid solvent/propellant to by-pass the sample cylinder. A third conduit extends from an outlet of the sample cylinder to a second junction with the second conduit. A first flow restrictor is interposed in the third conduit intermediate the sample cylinder outlet and the second junction with the second conduit and a second flow restrictor interposed in said second conduit downstream of said first junction and upstream of the second junction with said third conduit. The second flow restrictor is of a higher pressure rating than the first flow restrictor for creating a pressure differential between the sample cylinder outlet and the by-pass portion upstream of said second junction to enable total absorption of the active ingredient whereby the active ingredient passes through the outlet and the by-passed portion of solvent/propellent absorbs and propels the absorbed active ingredient to a discharge station at which all liquid solvent/propellent vaporizes to discharge a mist of active ingredient particles. The flow restrictors and the conduits which create the pressure differential are located in a mixing head for the sample cylinder.

According to a further aspect of the invention a mixing head for a sample cylinder containing a charge of active ingredient which comprises a first conduit extending between a source of liquid solvent/propellent and an inlet for said sample cylinder for connecting said sample cylinder to said source. A first junction is located in the first conduit intermediate the source and the sample cylinder and a second conduit extending from the junction to by-pass the sample cylinder for dividing a flow of the liquid solvent/propellant upstream of the sample cylinder to cause a first portion of the liquid solvent/propellant to flow into the sample cylinder to both absorb and force out said active ingredient and a second portion of the liquid solvent/propellant to by-pass the sample cylinder. A third conduit extends from an outlet for the sample cylinder to a second junction with the second conduit. A first flow restrictor is interposed in the third conduit intermediate the cylinder outlet and the junction with the second conduit and a second flow restrictor is interposed in the second conduit downstream of said first junction and upstream of the second junction with the third conduit. The second flow restrictor is of a higher pressure rating than the first flow restrictor for creating a pressure differential between the sample cylinder outlet and the by-pass portion upstream of the second junction to enable total absorption of the active ingredient, whereby the active ingredient passes through the outlet and the by-passed portion of solvent/propellent absorbs and propels the absorbed active ingredient to a discharge station at which all liquid solvent/propellent vaporizes to discharge a mist of active ingredient particles.

The present invention may be carried out in an alternative manner having three conduits as before, but only one flow restriction, this being in the second conduit. In a preferred embodiment all three conduits are arranged in a single unit which is attached to the sample cylinder forming an inlet and outlet thereto, hereinafter referred to as "a mixing head".

As already, explained, liquid carbon dioxide is the preferred solvent/propellent. The active ingredient will depend upon the function to be performed and, consequently, a number of compounds may be used, including but not limited to repellents, antibacterials, fungicides, germicides, deodorants, antivirals, virals, biologicals, ripening agents, growth regulators such as methoprene, hydroprene, dimilin and fenoxycarb and antisprouting compounds, the preferred active ingredient chemicals of this invention are natural pyrethrum and synthetic pyrethroids. Pyrethrum is a pyrethrin, a botanical insecticide the active constituents of which are pyrethrins I and II and jasmolin I and II collectively known as "pyrethrins". The synthetic pyrethroids include allethrin, bifenthrin, bioresmethrin, cyfluthrin, cypermethrin, fenothrin, deltamethrin, esbiothrin, enothrin, fenvalerate, fluvalinate, lamda cyhalothrin, permethrin, resmethrin, tetramethrin, tralomethrin.

It is envisioned that multiple concentrations of active ingredient chemicals to solvent/propellent on a weight to weight basis are possible. The limiting factor being the solubility of the active ingredient chemical in the solvent/propellent. A 0.5% natural pyrethrum formula, that is 0.5% pyrethrins, 4.0% piperonyl butoxide, 7.9% petroleum distillate and 87.6% liquid carbon dioxide, may be used. This formula is recommended at the following dose (use) rates:

| 1. Flying Insects | 8 g per 1,000 cubic feet (28.32 m$^3$) |
|---|---|
| 2. Crawling Insects | 16 g per 1,000 cubic feet (28.32 m$^3$) |
| 3. Saw Toothed Grain and Cigarette Beetles | 24 g per 1,000 cubic feet (28.32 m$^3$) at 2 hours of exposure |
| 4. Tribolium | Aid to control |

This can be expressed as a level of pyrethrum, or, stated another way, the amount of 100% active ingredient pyrethrum in the above formula. The level of active ingredient (AI) is the controlling aspect. It does not matter if that level comes from a 3%, 1% or 0.5% formula. In other words, 2×0.5% formula is equivalent to 1×1% formula.

| 1. Flying Insects | 0.04 g AI/1,000 cubic feet (28.32 m$^3$) |
|---|---|
| 2. Crawling Insects | 0.08 g AI/1,000 cubic feet (28.32 m$^3$) |
| 3. Saw Toothed Grain and Cigarette Beetle | 0.12 g AI/1,000 cubic feet (28.32 m$^3$) |
| 4. Tribolium | Aid to control |

BRIEF DESCRIPTION OF THE DRAWINGS

In order that the invention may be more clearly understood, preferred embodiments thereof will be described with reference to the accompanying drawings in which.

DETAILED DESCRIPTION

Figure 1:
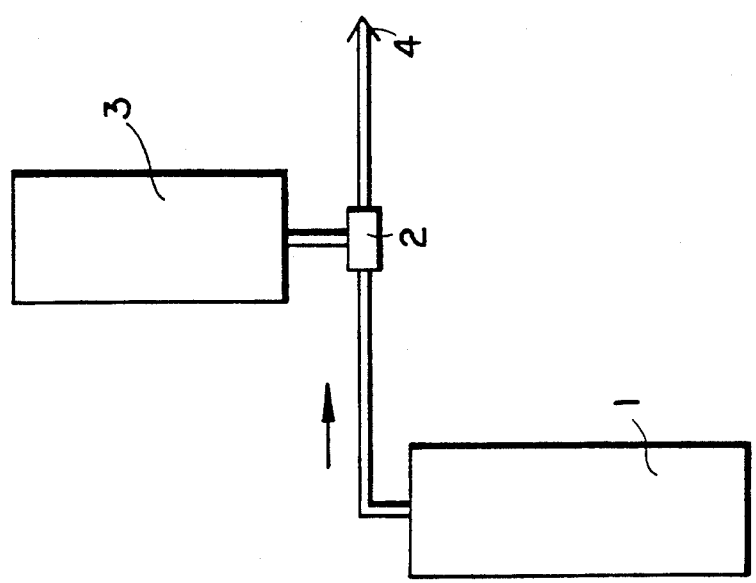
FIG. 1 is a schematic representation of a simplified system embodying the concept of the invention.

Referring now to the drawings, FIG. 1 is a simple arrangement incorporating a source of solvent/propellent. That source is most conveniently in the form of a cylinder 1 but may, if a large volume is required, be a plurality of cylinders interconnected by a manifold. The cylinder 1 is connected to a three way-valve 2 by a conduit and the valve interconnects the source cylinder 1 with a sample or dosing cylinder 3 and a dispensing nozzle 4.

In the example described with reference to the schematic illustration of FIG. 1, the solvent/propellent is liquid carbon dioxide and the active ingredient is a desired composition such as listed in the foregoing paragraphs of this specification. The example will also be described in connection with the desired dispersal of the active ingredient in mist form in the amount required to fumigate, or otherwise treat, an enclosure of known measured volume. With that known volume to be permeated, and with the system at rest with the valve 2 isolating the solvent propellent, a calculated amount of active ingredient is placed in the cylinder 3.

In order to ready the charge for dispersal, the valve 2 is turned to connect the cylinder 1 with the cylinder 3 while isolating the dispensing nozzle 4. The solvent/propellent, in this case liquid carbon dioxide, is under pressure (approximately 840 psi) and enters and fills the cylinder 3. At this stage it is unnecessary further to manipulate the valve 2 since, under constant conditions of temperature and pressure, a state of equilibrium will be reached between the cylinders 1 and 3 and the cylinder 3 cannot be overfilled. Upon entering the cylinder 3, the pressurized liquid carbon dioxide will partially evaporate before the state of equilibrium is reached at which point within the cylinder 3 there will be a portion of liquid carbon dioxide and a portion of gaseous carbon dioxide. The liquid portion acts as a solvent and totally absorbs the measured amount of active ingredient which had been placed in the cylinder 3. The gaseous portion of carbon dioxide does not act as a solvent.

The pressure of liquid carbon dioxide remaining in the cylinder 1 is sufficient to prevent any backflow of absorbed active ingredient from the cylinder 3 to the cylinder 1 and, consequently, it is not necessary further to manipulate the valve 2 at this stage.

When it is desired to fumigate or otherwise fill the enclosure, the valve 2 is then manipulated (a) to isolate the source of solvent/propellent and (b) to connect the cylinder 3 with the dispensing nozzle 4. With the cylinder 3 in communication with the nozzle 4 through the shown conduits, the cylinder 3 is effectively vented to atmosphere whereupon the gaseous portion of the carbon dioxide acts as a propellent to expel the liquid portion of the carbon dioxide together with the active ingredient absorbed thereby through the dispensing nozzle 4. Upon exiting through the dispensing nozzle the liquid carbon dioxide further expands to form a mist of borne particles of active ingredient into the enclosure.

From the foregoing description of the embodiment shown in FIG. 1 of the drawings, it will be appreciated that a metered amount of active ingredient is dispensed and, consequently, neither more nor less active ingredient will be dispersed than is necessary for the desired purpose. The system is extremely simple in nature requiring essentially only one moving part, i.e. the valve 2, two cylinders, one of liquid carbon dioxide to act as a solvent/propellent and the other to receive a calculated charge of active ingredient, and conduits interconnecting the component parts and leading to a dispensing nozzle. The conduits are preferably flexible hoses with quick disconnect attachments at their ends not only to permit convenient and rapid assembly and dismantling of the system but also to facilitate replacement of spent cylinders.

Figure 2:
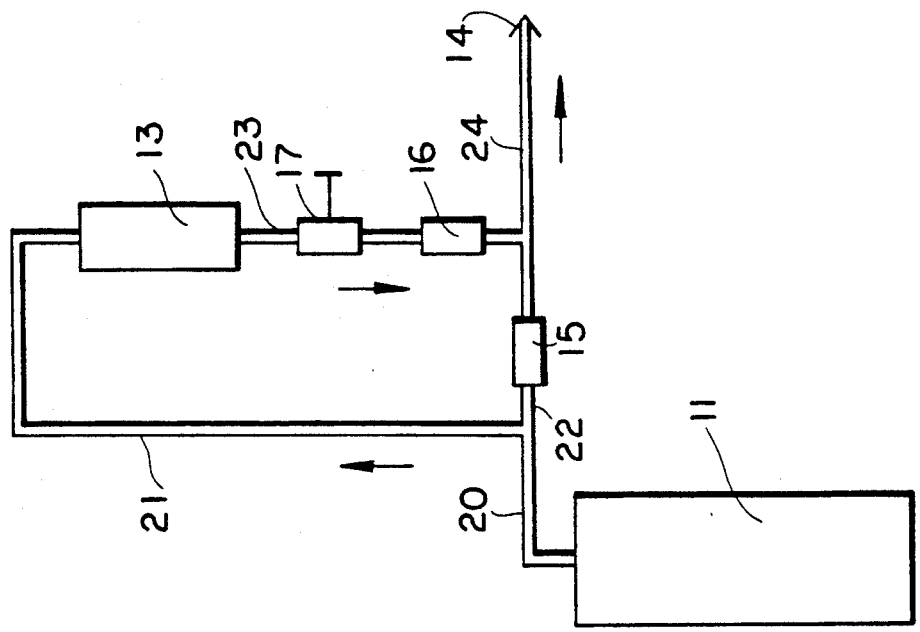
FIG. 2 is a schematic representation of a preferred system of the invention.

Another embodiment of the invention is shown in FIG. 2 of the drawings. That embodiment again includes a source of solvent/propellent in the form of a cylinder 11 of liquid carbon dioxide and a cylinder 13 for containing active ingredient. Conduits not only interconnect the cylinders 11 and 13 but also lead to a dispensing outlet 14.

The embodiment shown in FIG. 2 is capable either of dispersing a metered amount of active ingredient or of exhausting a total supply of active ingredient. Whichever of these alternative dispersals is desired, the system and operation is the same. In the event that a metered amount of active ingredient is to be dispersed, then, as in the case of the embodiment described with reference to FIG. 1, a calculated amount of active ingredient is placed in the cylinder 13. In the event that total dispersing is desired, then the cylinder 13 is filled with active ingredient. A conduit 20 leads from the cylinder 11 to a junction where it branches into two separate conduits 21 and 22. The conduit 21 leads directly to an inlet to the cylinder 13 whereas the conduit 22 leads to a first check valve 15. A further conduit 23 extends from the exit of the cylinder 13 to a second check valve 16 and then to a junction where the conduit 23 joins with the conduit 22 downstream of said first and second check valves and from there to a conduit 24 to said dispensing nozzle 14. A further valve 17 is interposed in the conduit 23 downstream from the cylinder 13 and upstream from the second check valve 16. This further valve 17 is effectively an on/off valve or "tap".

Before solvent/propellent is permitted to flow from the cylinder 11 out through the conduit 20, the second check valve 16 will prevent the active ingredient from running out of the sample or dosing cylinder 13 due to gravity. This prevention will be effective even where, as in the preferred example, the active ingredient is in liquid form.

For reasons which will be apparent from the following description of the embodiment shown in FIG. 2, the first check valve 15 is gaged or calibrated to provide a substantially greater resistance to flow than the check valve 16. Conventional spring check valves can be used for this purpose and, in this preferred embodiment, the ratio is approximately 10:1.

In a case where it is not critical to dispense a metered amount of active ingredient, the sample cylinder 13 is filled with active ingredient and the cylinder 11 is charged with solvent/propellent. As in the case of the embodiment described with reference to FIG. 1, the preferred solvent/propellent is liquid carbon dioxide. Liquid carbon dioxide will flow from the cylinder 11 through the conduit 20 and will encounter substantial resistance imposed by the first check valve 15. Consequently, the liquid carbon dioxide will preferentially flow from the junction through the conduit 21 and into the cylinder 13 of active ingredient. Upon entering the cylinder 13 the pressurized liquid carbon dioxide acts in two ways. Firstly, as in the embodiment of FIG. 1, the liquid carbon dioxide will expand to create a liquid portion and a gaseous portion, with the liquid portion acting as a solvent to absorb the active ingredient and the gaseous portion remaining inactive. Secondly, the pressure of the liquid carbon dioxide will force unabsorbed active ingredient out of the cylinder 13 through conduit 23. Thus, if the on/off tap 17 is open, the gaseous portion of the carbon dioxide will act as a propellent to expel both the absorbed and unabsorbed active ingredient through the conduit 23 and through the second check valve 16. As the check valve 16 imposes substantially less resistance to passage than the check valve 15, the absorbed and unabsorbed active ingredient will pass therethrough into the conduit 24. As the line or conduit leading to and through the sample or dosing cylinder 13 is at a higher pressure than liquid carbon dioxide at the junction where the conduit 23 joins the conduit downstream of the check valve 15, the unabsorbed active ingredient forced through the conduit 23 will be injected into liquid carbon dioxide flowing through the conduit 22 downstream of the check valve 15 and will be fully absorbed at that point before passing through the conduit 24 to the dispensing nozzle 14.

Upon exiting from the dispensing nozzle 14, the liquid carbon dioxide bearing the absorbed active ingredient will rapidly expand causing a fogging or misting. This state will continue until all of the active ingredient which had previously been placed in the cylinder 13 is dispersed whereupon no fogging or misting will occur at the dispensing nozzle 14 and, instead, there will merely be the noise of expanding and vaporizing liquid carbon dioxide. At this point the system can be closed down by isolating the solvent/propellent source cylinder 11 by valve means (not shown) and the sample or dosing cylinder recharged with active ingredient.

If, on the other hand, it is again desired to meter a controlled amount of active ingredient into the controlled environment, then only a calculated amount of active ingredient is placed in the cylinder 13 prior to start up and the valve or tap 17 is closed to prevent egress of any absorbed active ingredient. Upon opening the valve or tap 17, any unabsorbed active ingredient will be absorbed upon injection into the stream of solvent/propellent passing through the check valves 15 and, thereafter, all absorbed active ingredient will be discharged as described and, again, the system can be temporarily closed down when no misting or fogging is observed to occur at the discharge nozzle 14.

Figure 3:
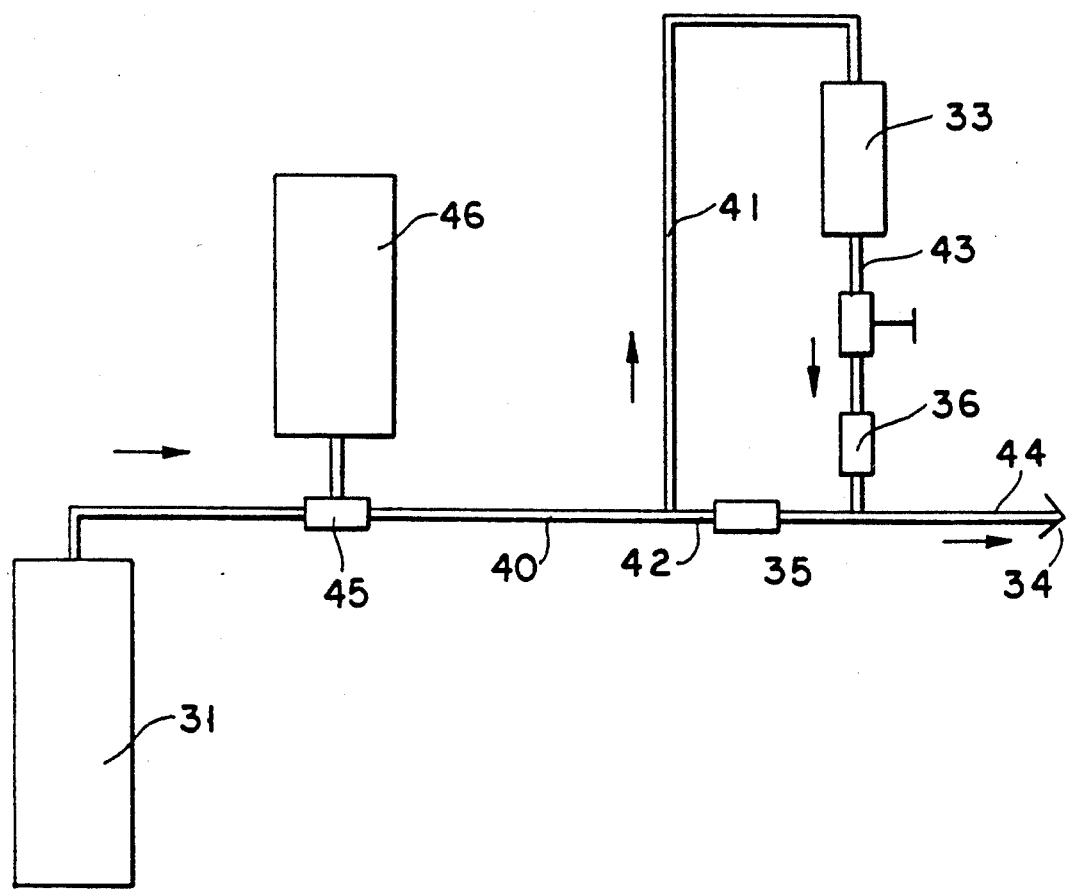
FIG. 3 is a schematic representation of a still further embodiment of the invention.
Figure 4A:
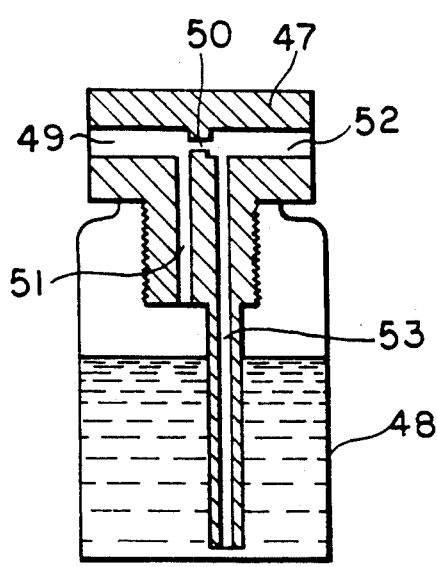
FIG. 4 (A-E) is a schematic representation of the operation of a mixing head for a sample cylinder according to the invention.
Figure 4B:
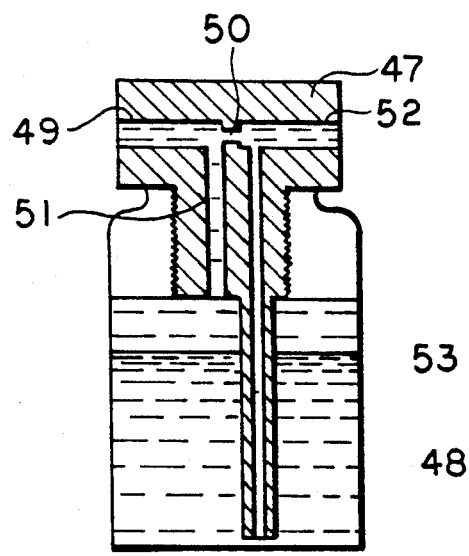
Figure 4C:
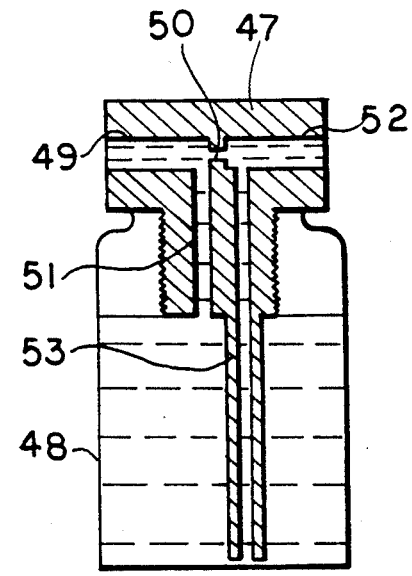
Figure 4D:
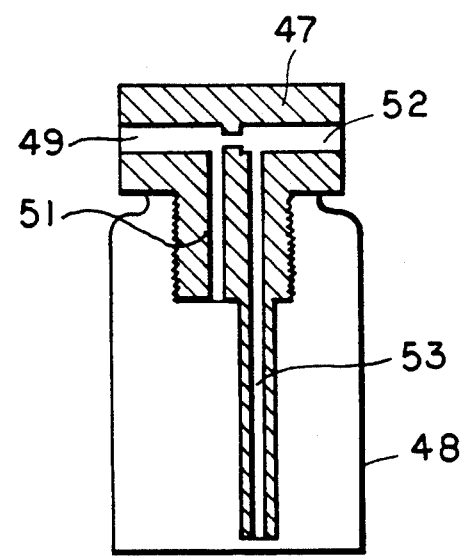
Figure 4E:
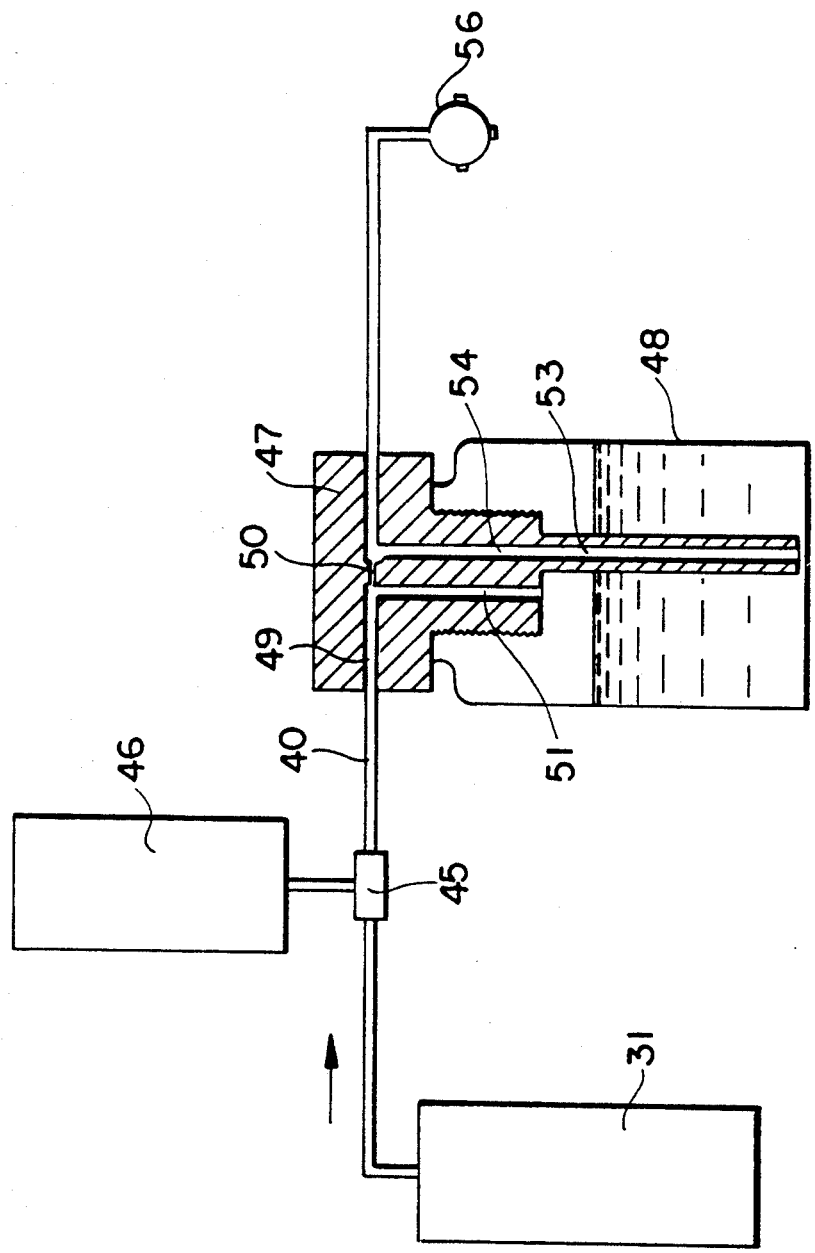

The embodiment shown in FIG. 3 represents a modification of the embodiment shown in FIG. 2 and described in the preceding paragraphs. The embodiment shown in FIG. 3, like that shown in FIG. 2, serves totally to dispense all of an amount of active ingredient placed in a sample cylinder 33. The system in FIG. 3 is similar to that in FIG. 2 and, to this end, includes a cylinder 31 containing a source of solvent/propellant, a conduit 40 leading from the cylinder 31 to a junction from which conduits 41 and 42 lead respectively to an inlet of the sample cylinder 33 and to a first check valve 35. A further conduit 43 leads from the outlet of the sample cylinder 33 to a coupling, downstream of the first check valve 35, with the conduit 42 and a conduit 44 leads from that coupling to a dispensing nozzle 34. A second check valve 36 is interposed in the conduit 43 and creates a lesser restriction to flow than the first check valve 35. In the foregoing respects, the embodiment of FIG. 3 is similar to that shown in FIG. 2. However, the embodiment of FIG. 3 includes a three-way valve 45 interposed in the conduit 40 and a dosing cylinder 46 which may selectively be coupled with the conduit 40 via said three-way valve 45. In this manner, a controlled volume of solvent/propellant can be isolated from the source provided by the cylinder 31 and thereafter the source cylinder 31 can be isolated and the total controlled volume expelled, with absorbed active ingredient, through the dispensing nozzle 34.

The system illustrated in FIG. 3 is prepared by adjusting the three-way valve 45 to isolate the supply of solvent/propellant in the cylinder 31. The cylinder 33 is filled with active ingredient. The three-way valve 45 is then manipulated to provide a flow connection between the cylinder 31 and the cylinder 46 while isolating the conduit 40 downstream of said valve 45. Solvent/propellent, again most conveniently liquid carbon dioxide, will flow from the cylinder 31 to the cylinder 46 until a state of equilibrium is reached. In order to disperse the active ingredient, the three-way valve 45 is then manipulated again to isolate the cylinder 31 while placing the cylinder 46 in communication with the conduit 40. Thereafter, the cylinder 46 is totally discharged entraining the active ingredient in the manner described in the embodiment of FIG. 2 and dispersing the active ingredient through the dispensing nozzle 34.

In the preceding embodiments, the conduits and flow restrictors which create a pressure differential between the sample cylinder outlet and the by-pass portion are shown located external to the sample cylinder.

An alternative arrangement is shown schematically in FIG. 4 A–D in which the respective conduits and flow restrictors are located in a 'mixing' head 47 for the sample cylinder 48.

FIG. 4A shows the sample cylinder prior to liquid carbon dioxide pressurization. The operation of the system is as follows:

Liquid carbon dioxide enters the mixing head 47 via a conduit 49 connected to the carbon dioxide source. As shown in FIG. 4B the liquid carbon dioxide encounters resistance imposed by a flow restriction orifice 50 making the liquid carbon dioxide flow preferentially through a conduit 51 and into the cylinder 48 of active ingredient, the remainder by-passing the sample cylinder via conduit 52. Upon entering the cylinder 48 the pressurized liquid carbon dioxide acts as previously described to absorb some of the active ingredient. The pressure of the carbon dioxide forces both absorbed and unabsorbed active ingredient out of the cylinder 48 through dip tube 53 and the conduit 54 having a restrictive orifice. The diameters of the flow restrictors 50 and 54 act as, and in place of, check valves 15 and 16 in FIG. 2.

The unabsorbed active ingredient forced through the dip tube 53 and the conduit having a restricted orifice 54 is then injected into liquid carbon dioxide flowing through from the conduit 49 downstream of the flow restriction orifice 50 and is fully absorbed before passing through the conduit to the dispensing nozzle or discharge station 56.

The remaining liquid carbon dioxide flushes the sample cylinder as shown in FIG. 4C. The end of fogging is shown in FIG. 4D where the sample cylinder is void of active ingredient and carbon dioxide.

In the preceding embodiments, the absorbed active ingredient has been described as being discharged from a nozzle 4, 14 or 34. It will be appreciated that in a warehouse or factory to be fumigated, the discharge nozzle is most likely to take the form of an overhead sprinkler system from which the active ingredient can be uniformly dispersed throughout the contained volume.

While a particular embodiment of the present invention has been disclosed herein, it will be obvious to those skilled in the art that certain changes and modifications can be made to it all included in the scope of the present invention. Instead of rated or calibrated first and second check valves, flow restriction orifices can be provided respectively in the conduits such as 22, 42 and 23, 43. In this case, the size of the orifice in the conduits 22, 42 will be substantially smaller than the size of the orifice in the conduit 23, 43 and, again, a ratio of 10:1 may be adopted. All such changes and modifications can be made without departing from the invention as defined by the appended claims.

We claim:

1. Apparatus for mixing and dispensing an active ingredient comprising a source of liquid solvent/propellant;

a sample cylinder containing a charge of active ingredient;

a first conduit extending between said source and an inlet of said sample cylinder for connecting said sample cylinder to said source;

a first junction located in said first conduit intermediate said source and said sample cylinder and a second conduit extending from said junction to by-pass said sample cylinder for dividing a flow of said liquid solvent/propellant upstream of said sample cylinder to cause a first portion of said liquid solvent/propellant to flow into said sample cylinder to both absorb and force out said active ingredient and a second portion of said liquid solvent/propellant to by-pass said sample cylinder;

a third conduit extending from an outlet of said sample cylinder to a second junction with said second conduit;

a first flow restrictor interposed in said third conduit intermediate the sample cylinder outlet and the second junction with said second conduit and a second flow restrictor interposed in said second conduit downstream of said first junction and upstream of the second junction with said third conduit, said second flow restrictor being of higher pressure rating than said first flow restrictor for creating a pressure differential between said sample cylinder outlet and said second portion upstream of said second junction to enable total absorption of the active ingredient whereby said active ingredient passes through the outlet and said second portion of solvent/propellent absorbs and propels said active ingredient to a discharge station at which all liquid solvent/propellent vaporizes to discharge a mist of active ingredient particles;

wherein said flow restrictors and said conduits which create said pressure differential are located in a mixing head for said sample cylinder.

2. Apparatus according to claim 1, wherein said first and second flow restrictors are first and second orifices.

3. Apparatus according to claim 1, wherein the pressure rating of said second flow restrictor is approximately ten times the pressure rating of said first orifices.

4. Apparatus according to claim 2, wherein the pressure rating of said second flow restrictor is approximately ten times the pressure rating of said first flow restrictor.

5. A mixing head for a sample cylinder containing a charge of active ingredient, said mixing head comprising:

a first conduit extending between a source of liquid solvent/propellent and an inlet for a sample cylinder for connecting said sample cylinder to said source;

a first junction located in said first conduit intermediate said source and said sample cylinder and a second conduit extending from said first junction to by-pass said sample cylinder for dividing a flow of said liquid solvent/propellant upstream of said sample cylinder to cause a first portion of said liquid solvent/propellant to flow into said sample cylinder to both absorb and force out said active ingredient and a second portion of said liquid solvent/propellant to by-pass said sample cylinder;

a third conduit extending from an outlet for said sample cylinder to a second junction with said second conduit;

a first flow restrictor interposed in said third conduit intermediate the sample cylinder outlet and the second junction with said second conduit and a second flow restrictor interposed in said second conduit downstream of said first junction and upstream of the second junction with said third conduit, said second flow restrictor being of higher pressure rating than said first flow restrictor for creating a pressure differential between said sample cylinder outlet and said second portion upstream of said second junction to enable total absorption of the active ingredient whereby said active ingredient passes through the outlet and said second portion of solvent/propellent absorbs and propels said active ingredient to a discharge station at which all liquid solvent/propellent vaporizes to discharge a mist of active ingredient particles.

6. Apparatus according to claim 5, wherein said first and second flow restrictors are first and second orifices.

7. Apparatus according to claim 5, wherein the pressure rating of said second flow restrictor is approximately ten times the pressure rating of said first orifices.

8. Apparatus according to claim 6, wherein the pressure rating of said second flow restrictor is approximately ten times the pressure rating of said first flow restrictor.

* * * * *